United States Patent

[11] 3,628,937

| [72] | Inventor | Lawrence A. Schott<br>15940 Warwick, Detroit, Mich. 48223 |
|---|---|---|
| [21] | Appl. No. | 61,314 |
| [22] | Filed | Aug. 5, 1970 |
| [45] | Patented | Dec. 21, 1971<br>Continuation-in-part of application Ser. No. 770,245, Oct. 24, 1968, now abandoned. This application Aug. 5, 1970, Ser. No. 61,314 |

[54] APPARATUS FOR MAKING FOAMED GLASS PANELS
6 Claims, 6 Drawing Figs.

[52] U.S. Cl.......................................... 65/141,
    18/4 B, 65/22, 264/94
[51] Int. Cl........................................... C03b 19/08
[50] Field of Search........................................... 65/20, 22,
    141; 264/94, 93, 50; 18/4 B

[56] References Cited
UNITED STATES PATENTS
1,818,101   8/1931   Slidell............................ 65/22 X
2,261,022  10/1941   Fox et al.......................... 65/22

FOREIGN PATENTS
844,875    8/1939   France.......................... 65/22
1,252,136 12/1960   France.......................... 264/50

*Primary Examiner*—S. Leon Bashore
*Assistant Examiner*—Robert L. Lindsay, Jr.
*Attorney*—Hauke, Gifford and Patalidis ABSTRACT: A method and apparatus for making cellular or foamed glass panels including heating glass to its molten state in a furnace and feeding the molten glass past an elongated rotating paddle wheel having a length substantially equal to the width of the panels desired. The rotating paddle wheel is submerged in the molten glass and is adapted to supply pressurized gas through apertures in the structure of the paddle wheel for forming bubbles. The rotation of the wheel thoroughly mixes the bubbles into the molten glass. The foamed glass is then conveyed away from the paddle wheel by means of a conveyor system and allowed to cool. The cooled foamed glass is then cut into panels of the desired length.

PATENTED DEC 21 1971 3,628,937

INVENTOR
LAWRENCE A. SCHOTT
BY
Hauke Gifford & Patalidis
Attorneys

INVENTOR
LAWRENCE A. SCHOTT

APPARATUS FOR MAKING FOAMED GLASS PANELS

CROSS-REFERENCE TO RELATED APPLICATIONS

The present application is a continuation-in-part of application, Ser. No. 770,245, filed Oct. 24, 1968 now abandoned.

BACKGROUND OF THE INVENTION

1. Field of the Invention

The present invention relates to the manufacture of glass products, and more particularly to a method and apparatus for manufacturing foamed glass panels preferably for use as thermoinsulation and as a lightweight building material.

2. Description of the Prior Art

Heretofore, foam glass panels have been prepared by blowing air or other gas into molten glass and allowing the molten glass to cool with the bubbles of air or gas entrapped in the mass of the solidified glass. Alternatively, chemical foaming agents have been added to molten glass to form gas bubbles therein and the molten glass with the gas bubbles therein is allowed to solidify by cooling.

The disadvantages of either of the above-described processes include the uneven distribution of gas bubbles through the molten glass, thereby creating a nonuniform structure having nonuniform properties. Furthermore, the bubbles distributed within the glass are of an uneven size, further causing nonuniformity within the foam glass panels.

SUMMARY OF THE INVENTION

The present invention provides a method and apparatus for producing foamed glass panels having gas bubbles therein which are uniformly distributed throughout the panel and of substantially uniform size, thus making foamed glass panels which are uniform in structure and, which have uniform properties throughout. The method and apparatus of the present invention includes heating glass or glass-making constituents, to a molten state in a furnace and feeding the molten glass through a gate formed in a wall of the furnace past an elongated paddle wheel having its axis of elongation disposed in a substantially horizontal plane. The paddle wheel is connected to a source of power for rotating it about its axis of elongation and connected to a supply of pressurized gas. The paddle wheel includes apertures formed therein such that as the wheel is rotated by the power source, gas from the pressurized supply is fed through the paddle wheel into the molten glass.

The gas injected into the molten glass is broken up into substantially evenly sized bubbles and is thoroughly mixed into the glass by the rotation of the paddle wheel, resulting in an even distribution of bubbles within the glass.

The foamed molten glass is conveyed away from the paddle wheel by a conveyor system and allowed to cool and solidify into a continuous panel which is cut into sections of desired lengths.

DESCRIPTION OF THE DRAWINGS

The description offers to the accompanying drawings wherein like reference characters refer to like parts throughout the several views, and in which.

DESCRIPTION OF THE PREFERRED EMBODIMENT

Figure 1:
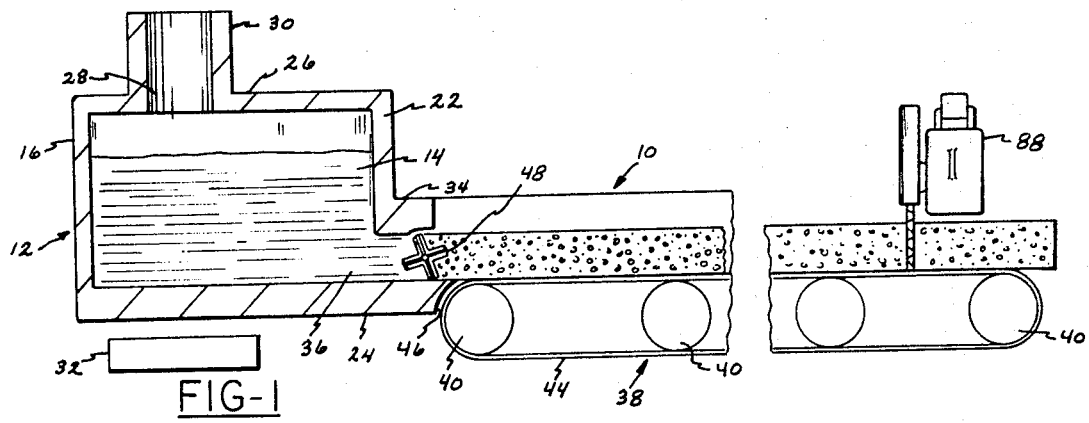
FIG. 1 is a schematic longitudinal section of the apparatus of the present invention.
Figure 2:
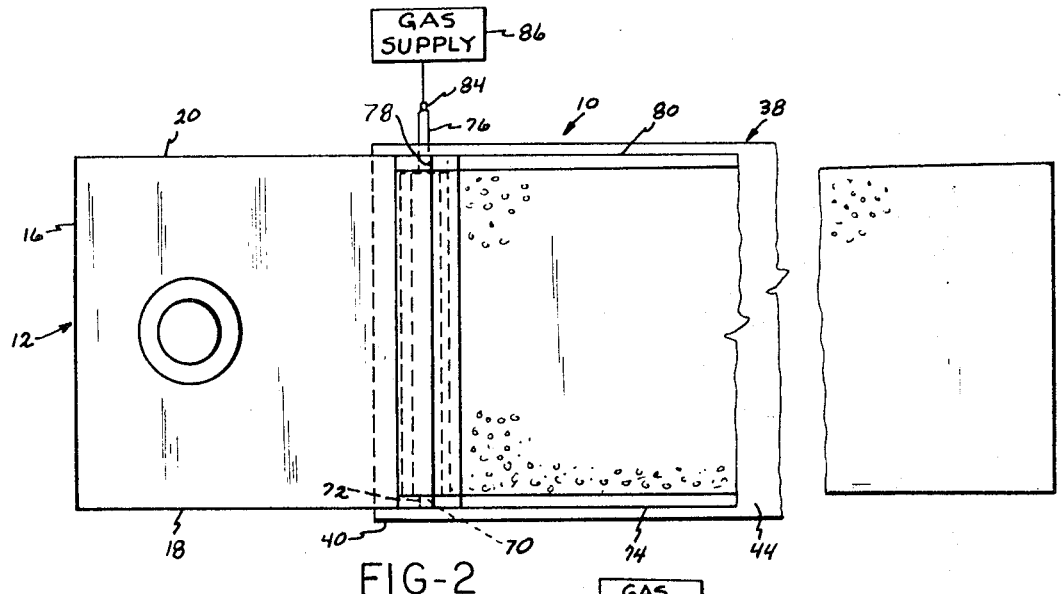
FIG. 2 is a top view of the apparatus shown in FIG. 1.

Referring to FIG. 1, an example of apparatus for practicing the present invention for forming foamed glass panels, generally indicated at 10, includes a furnace 12 for holding the molten glass 14. Referring to FIGS. 1 and 2, the furnace 12 includes sidewalls, generally indicated at 16, 18, 20 and 22, a bottom wall 24 and a top wall 26. The top wall 26 has an aperture 28 formed therein provided with a chute or hopper 30 for loading the furnace 12 with pieces of scrap glass or with appropriate glass making raw materials for heating to a molten state. The furnace 12 is heated by a source of heat, generally indicated at 32, preferably disposed immediately below the bottom wall 24.

The sidewall 22 extends downwardly from the top wall 26 for approximately two-thirds of the height of the furnace and is provided with a forehearth formed by an outwardly extending flange 34 disposed in a substantially horizontal plane and extending along the bottom edge of the sidewall 22. Thus, a forehearth 36 is defined between the bottom surface of the flange 34 and a projecting portion of the bottom wall 24 of the furnace 12 for allowing the molten glass to flow by gravity from the furnace 12.

A conveyor system 38 is disposed at the outlet of the forehearth 36 and includes a plurality of rolls 40 supporting and translating a conveyor belt 44 so as to provide a moving surface for reasons to be described. The projecting portion of the bottom wall 24 of the furnace 12 includes end in arcuate edge 46 disposed in sealing contact with the conveyor belt 44 where it is wound around the first roll 40 to prevent leakage of molten glass between the edge of the bottom wall 24 and the conveyor belt 44.

Figures 3, 4:
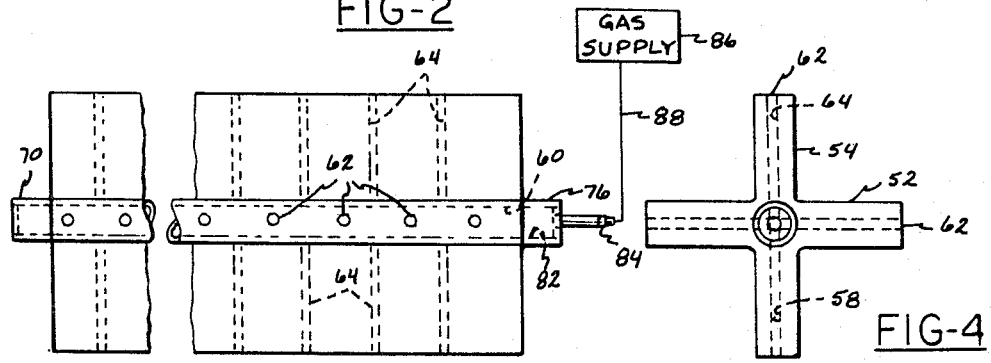
FIG. 3 is an enlarged side elevation view of an example of paddle wheel forming part of the present invention.
FIG. 4 is an end view of the paddle wheel shown in FIG. 3.

An elongated rotatable paddle wheel 48 having its axis of rotation disposed in a substantially horizontal plane is transversely disposed in the forehearth 36 submerged in the mass of molten glass flowing therethrough. Referring to FIGS. 3 and 4, an example of paddle wheel 48 includes four elongated paddle members 52, 54, 56 and 58 is made, for example, of steel plates welded together in the configuration shown such that the paddle members 52 and 56 are disposed in a common plane and the paddle members 54 and 58 disposed in common plane substantially perpendicular to the plane of paddle members 52 and 56. A gas delivery manifold 60 is disposed substantially along the axis of rotation of the paddle wheel 48 and a plurality of outlet apertures 62 are disposed along the outer edge of each paddle member, each aperture 62 being connected to the manifold 60 by passageways 64.

The paddle wheel 48 includes a solid cylindrical stud 70 blocking one end of the manifold 60 and extending outwardly therefrom. The stud 70 is journaled in a bearing 72 formed in one of the sidewalls of the forehearth 36. A second cylindrical stud 76 extends outwardly from the other end of the paddle wheel 48 and is journaled in a bearing 78 formed in the other sidewall of the forehearth 36. The cylindrical stud 76 has a passageway 82 formed therethrough which extends inwardly from its outer end and leads into the manifold 60. A rotating line coupling 84 is connected to the outer end of the passageway 82 and communicates with a gas supply 86 via a line 88. Any conventional power source such as provided by an electric motor and transmission or a pulley and belt arrangement is connected to the stud 76 for rotating the paddle wheel 48.

In operation glass, or raw materials for glass making, is placed in the furnace 12 through the chute 30 and is heated therein to a molten state. The molten glass is allowed to flow through the forehearth 36 past the paddle wheel 48. The paddle wheel 48 is rotated by the power source in either the clockwise or counterclockwise direction, as illustrated in FIG. 1. Simultaneously, gas is supplied to the paddle wheel from the gas supply 86. The gas flow from the supply 86 through the coupling 84 and the passageway 82, into the manifold 60 and through the passageways 64 in the paddle wheel 48. Consequently, the gas is injected through the apertures 62 in the paddle members 52, 54, 56 and 58 of the rotating paddle wheel into the molten glass flowing through the forehearth 36. The injected gas forms bubble in the molten glass and the rotation of the paddle wheel thoroughly mixes the gas bubbles into the molten glass, ensuring that they are evenly distributed throughout the mass of the glass. Furthermore, the rotation of the paddle wheel 48 breaks up the larger gas bubbles such that the gas bubbles are approximately the same size, creating a uniform cellular or foamed glass structure having uniform properties throughout.

The molten foamed glass is conveyed away from the paddle wheel 48 by the conveyor system 38. Sidewalls 74 and 80 ensure that the molten glass does not flow off the conveyor belt 44. As the molten glass is conveyed away by the conveyor system 38, it gradually cools and solidifies into foamed glass. Once the foamed glass has solidified, it is cut into the lengths desired by a saw assembly 88 disposed above the conveyor belt 44. Thus, an apparatus and method are disclosed for manufacturing foamed glass panels having a uniform structure and uniform properties throughout.

Figure 5:
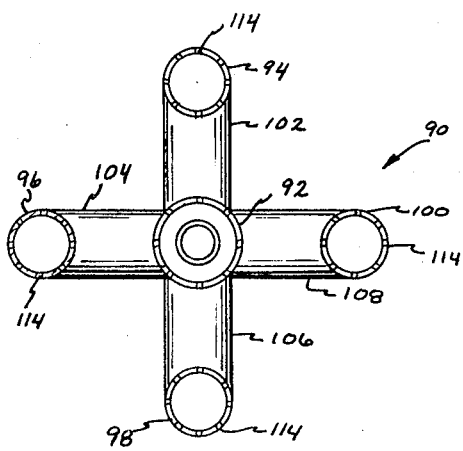
FIG. 5 is an end view of another example of paddle wheel.
Figure 6:
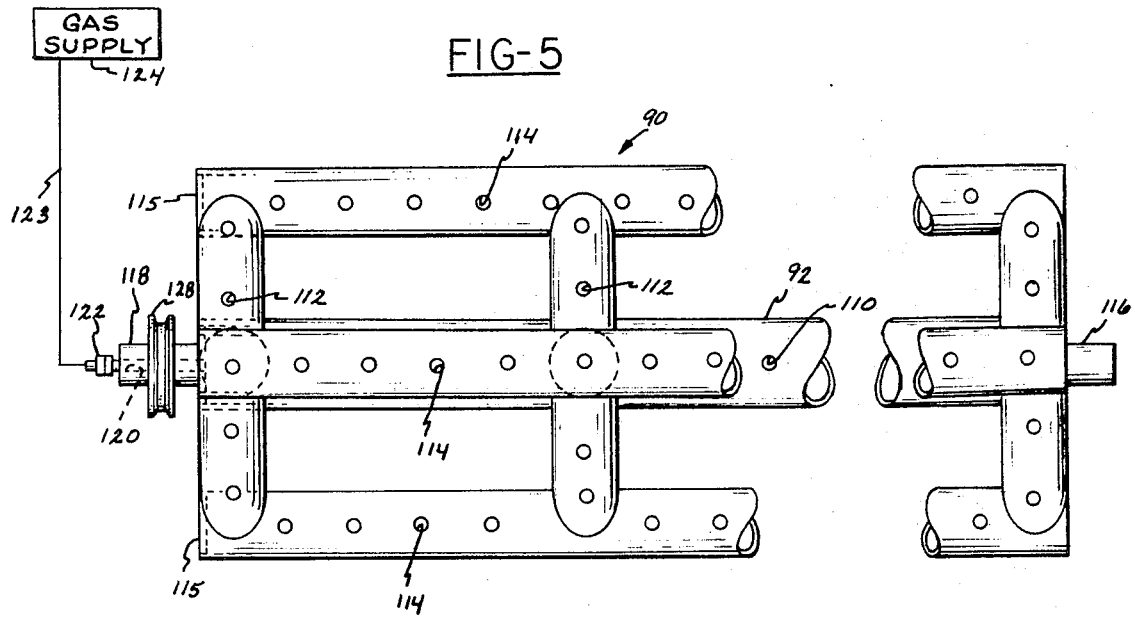
FIG. 6 is a side elevation view of the paddle wheel shown in FIG. 5.

Referring to FIGS. 5 and 6, an alternate embodiment of paddle wheel is shown at 90 which may be used in the stead of the paddle wheel 48 shown in FIGS. 1–4. The paddle wheel 90 includes an elongated tubular member 92 which forms the central hub member of the paddle wheel. The paddle wheel 90 further comprises four elongated peripheral tubular members 94, 96, 98 and 100, preferably having a slightly smaller outer diameter than the hub member 92 extending parallel to the hub member 92. The peripheral members 94, 96, 98 and 100 are secured to the hub member 92 at equal radial distances therefrom and at 90° intervals by way of a plurality of radially extending tubular spoke members 102, 104, 106 and 108, respectively. The hub member 92 is provided with a plurality of gas outlet apertures 110 to allow gas supplied thereto to be injected into the molten glass. The tubular spoke members 102, 104, 106 and 108, are also preferably provided with gas outlet apertures 112 and the peripheral tubular members 94, 96, 98 and 100 are also provided with gas outlet apertures 114 for injecting gas into the molten glass. Each of the peripheral tubular members 92, 94, 96, 98 and 100 have both of their ends sealed with ends plates, as shown at 115.

The hub member 92 has a pair of solid cylindrical studs 116 and 118 extending outwardly from both ends to provide appropriate journal support of the paddle wheel in corresponding bearings. The stud 118 for example has a longitudinal passageway 120 for placing in communication with the interior of the tubular hub member 92, a source of gas 124 via a rotating coupling 122 and a line 123 for supplying gas to the interior of the paddle wheel 90. A pulley 128, or any other convenient driving means, is mounted on the stud 118 for rotating the paddle wheel 90 about its axis of rotation by any convenient power means such as an electric motor or the like.

Thus, the paddle wheel 90 may be substituted for the paddle wheel 48 of FIGS. 1–4. While the paddle wheel 90 is rotated by the power source, gas is supplied to the interior of the wheel from the gas supply, the line 123, the coupling 122 and the passageway 120 into the hub member 92. A portion of the gas flows out the apertures 110 and is injected into the molten glass, while the remainder flows into the spoke members 102, 104, 106 and 108 and the peripheral members 94, 96, 98 and 100. Therefore, gas is also injected into the molten glass from the injection apertures 112 and 114.

It will be noted that it will take less power to rotate the paddle wheel 90 than it will take to rotate the paddle wheel 48, since the wheel 90 allows the molten glass to flow between the outer peripheral members 94, 96, 98 and 100 and the hub member 92.

Although there has been described preferred embodiments of the invention, it is to be understood that various changes and revisions can be made therein without departing from the spirit of the invention or the scope of the appended claims.

I claim:

1. An apparatus for making foamed glass panels, comprising:
   a furnace for containing molten glass and maintaining said glass in its molten state, said furnace having a discharge opening;
   a paddle wheel disposed adjacent said discharge opening and rotatable about its axis for stirring said molten glass as it flows through said opening; wherein said paddle wheel includes apertures therein and is connected to a source of pressurized gas for injecting said gas through said apertures into said molten glass while being stirred by said paddle wheel; and
   means for conveying the molten foamed glass away from said paddle wheel.

2. The apparatus as defined in claim 1, wherein said paddle wheel is rotatably mounted at each end and includes four elongated outwardly extending members, two of said outwardly extending members being disposed in a first plane and the remaining two outwardly extending members being disposed in a second plane substantially perpendicular to said first plane, a bore extending inwardly from one end of said paddle wheel with said source of pressurized gas connected thereto, each of said outwardly extending members having a plurality of bores extending inwardly from its outer edge into said bore for introducing gas into said molten glass.

3. The apparatus as defined in claim 1, wherein said paddle wheel includes an elongated tubular hub member rotatably mounted at each end and having apertures formed therein, a plurality of tubular spoke members having one end secured to said hub member and extending radially outwardly therefrom, elongated tubular peripheral members secured to the outer ends of said connecting members with their axes of elongation substantially parallel to the axis of elongation of said hub member and having apertures formed therein, said hub member being connected to a source of pressurized gas for introducing gas into said molten glass through the apertures formed in said hub member and said peripheral members.

4. The apparatus as defined in claim 3, wherein said spoke members have apertures formed therein for introducing gas into said molten glass.

5. The apparatus as defined in claim 1, and including a conveyor for conveying said molten foamed glass away from said paddle wheel.

6. The apparatus as defined in claim 5, and including a pair of sidewalls disposed along the sides of said conveyor for holding said molten foamed glass on said conveyor as it is being conveyed away from said paddle wheel.

* * * * *

SLS-103-A-1

UNITED STATES PATENT OFFICE
CERTIFICATE OF CORRECTION

Patent No. 3,628,937            Dated  DECEMBER 21, 1971

Inventor(s)    LAWRENCE A. SCHOTT

It is certified that error appears in the above-identified patent and that said Letters Patent are hereby corrected as shown below:

IN THE SPECIFICATION

Column 1, line 58, change "offers" to -- refers --

Column 2, line 24, change "end" to -- ends -- line 34, before "made" cancel "is"

line 73, change "bubble" to -- bubbles --

IN THE CLAIMS

Column 4, line 18, before "opening" insert -- discharge --

Signed and sealed this 23rd day of May 1972.

(SEAL)
Attest:

EDWARD M. FLETCHER, JR.        ROBERT GOTTSCHALK
Attesting Officer              Commissioner of Patents